United States Patent [19]

Schmidt-Brücken

[11] Patent Number: 6,059,059
[45] Date of Patent: May 9, 2000

[54] DRIVE ARRANGEMENT FOR A MOTOR VEHICLE

[75] Inventor: Hans-Joachim Schmidt-Brücken, Sömmersdof, Germany

[73] Assignee: Mannesmann Sachs AG, Schweinfurt, Germany

[21] Appl. No.: 09/035,460

[22] Filed: Mar. 5, 1998

[30] Foreign Application Priority Data

Mar. 7, 1997 [DE] Germany ............................ 197 09 457

[51] Int. Cl.⁷ ................................................. B60K 6/04
[52] U.S. Cl. ............................................. 180/65.3; 701/22
[58] Field of Search ................................. 180/65.2, 65.3, 180/65.4, 65.6, 65.8; 701/22, 56; 290/14, 16, 19

[56] References Cited

U.S. PATENT DOCUMENTS

| | | | |
|---|---|---|---|
| 1,980,165 | 11/1934 | Burleigh ................................. | 290/14 |
| 4,305,254 | 12/1981 | Kawakatsu et al. ................... | 180/65.2 |
| 4,335,429 | 6/1982 | Kawakatsu ............................. | 701/22 |
| 5,492,189 | 2/1996 | Kriegler et al. ....................... | 180/65.2 |
| 5,558,588 | 9/1996 | Schmidt ................................. | 475/5 |
| 5,558,589 | 9/1996 | Schmidt ................................. | 475/5 |
| 5,558,595 | 9/1996 | Schmidt et al. ....................... | 477/3 |
| 5,577,973 | 11/1996 | Schmidt ................................. | 475/5 |
| 5,697,466 | 12/1997 | Moroto et al. ......................... | 701/22 |
| 5,823,280 | 10/1998 | Lateur et al. .......................... | 180/65.2 |
| 5,833,022 | 11/1998 | Welke .................................... | 180/65.4 |

FOREIGN PATENT DOCUMENTS

| | | | |
|---|---|---|---|
| 0 743 215 A2 | 11/1996 | European Pat. Off. ........... | B60K 6/04 |
| 0 744 314 A1 | 11/1996 | European Pat. Off. ......... | B60L 11/12 |
| 2444564 | 4/1976 | Germany .............................. | 180/65.2 |
| 3243514 | 9/1984 | Germany .............................. | 180/65.2 |
| 47-31336 | 11/1972 | Japan . | |
| 55-127221 | 10/1980 | Japan .................................... | 180/65.4 |
| 6-38305 | 2/1994 | Japan . | |
| 6-48190 | 2/1994 | Japan . | |
| 8-98322 | 4/1996 | Japan . | |
| 91/08919 | 6/1991 | WIPO ................................... | 180/65.2 |

OTHER PUBLICATIONS

"Dual System—Newly Developed Hybrid System", Kozo Yamaguchi and Yoshinori Miyaishi, *Mutsumi Kawamoto*, pp. 603–610, No Date.

*Primary Examiner*—Eric Culbreth
*Assistant Examiner*—F. B. Vanaman
*Attorney, Agent, or Firm*—Cohen, Pontani, Lieberman & Pavane

[57] ABSTRACT

A hybrid drive arrangement for a motor vehicle including an internal combustion engine (1), which is connected or can be connected in a wheel-driving manner, via a first torque transmission path (11, 13), to a driving wheel (15) of the motor vehicle. An electric machine (19), which is operable at least as a motor, is fed from an electrical energy source (7, 29) of the motor vehicle and is connected or can be connected in a wheel-driving manner, via a second torque transmission path (21, 23, 13), to the driving wheel (15). Arranged in the first and/or the second torque transmission path are coupling elements (11, 23) which, in a first operating state, permit the driving of the motor vehicle by the wheel-driving torque of the electric machine (19), operated as a motor, without mechanical torque support from the internal combustion engine (1), and which, in a second operating state, permit the driving of the motor vehicle by the internal combustion engine (1), without mechanical torque support from the electric machine (19). Depending on the driving speed of the motor vehicle, an electronic driving control system (31) activates the first operating state, at least in a first range of driving speeds including standstill of the vehicle, if the driving speed is less than a predetermined speed limit, and activates the second operating state, at least in a second range including the maximum speed of the vehicle, if the driving speed is greater.

20 Claims, 1 Drawing Sheet

DRIVE ARRANGEMENT FOR A MOTOR VEHICLE

BACKGROUND OF THE INVENTION

1. Field of the Invention

The present invention relates to a hybrid drive for a non-railbound motor vehicle, which can be driven both by wheel-driving torque from an internal combustion engine and wheel-driving torque from an electric machine operated as a motor.

2. Description of the Related Art

There are different types of hybrid drives for motor vehicles. Serial hybrid drives feed the electric motor driving the driving wheels from a generator, which for its part is driven by the internal combustion engine of the motor vehicle. In this way, the internal combustion engine can be operated in a region of its characteristic map that is selected from the point of view of reducing the energy consumption and reducing pollutant emission. However, in the case of serial hybrid drives, the overall fuel consumption may be reduced only to a limited extent, and the output that is available in continuous operation is comparatively low. Under mass production boundary conditions such as cost and weight it is not possible with the current status of electric motor technology to implement driving outputs, as for example starting torque, maximum output, and maximum speed to match that of a powerful conventional drive. The advantage of serial hybrid drives is that they manage without a multi stage controlling transmission.

In the case of parallel hybrid drives, the output of the internal combustion engine and of an electric machine arranged in parallel is transmitted mechanically to the driving wheels. However, it is still necessary for a variable transmission to be arranged in the torque transmission path between the internal combustion engine and, if appropriate, the electric motor, on the one hand, and the driving wheels, on the other hand.

Furthermore, hybrid drives that can be operated in several modes of operation are known, in which the internal combustion engine and an electric machine that can be operated both as a generator and as a motor are connected to the driving wheels of the motor vehicle via a common, power-dividing transmission, for example an epicyclic transmission or a differential transmission Hybrid drives of this type manage without a variable-ratio transmission, but require either complex mechanical designs with correspondingly unfavorable efficiencies or relatively voluminous electric machines, if they are intended to produce their maximum output in continuous operation, as for example described in European Patent publication 0 744 314 A1, European Patent publication 0 743 215 A2, U.S. Pat. Nos. 5,577,973, 5,558, 588, 5,558,589, 5,558,595 and in the symposium proceedings "EVS-13 The 13th International Electric Vehicle Symposium", Osaka, Japan, Vol. 1, pp. 603–610 Oct. 13–16, 1996.

It is therefore an object of the invention to provide a hybrid drive, which can be constructed in a comparatively compact form, for a motor vehicle capable of continuous operation at relatively high driving speeds.

SUMMARY OF THE INVENTION

The present inventive drive arrangement for a motor vehicle includes an internal combustion engine, which is connected or can be connected in a wheel-driving manner, via a first torque transmission path, to at least one driving wheel of the motor vehicle. A first electric machine, which can at least be operated as a motor, is to be fed from an electrical energy source of the motor vehicle and is connected or can be connected in a wheel-driving manner, via a second torque transmission path, to the driving wheel or the driving wheels. Coupling means are arranged in the first and/or the second torque transmission path. In a first operating state, the coupling means permit the driving of the motor vehicle by means of the wheel-driving torque of the first electric machine, without mechanical torque support from the internal combustion engine, and in a second operating state, permit the driving of the motor vehicle by wheel-driving torque from the internal combustion engine, without mechanical torque support from the first electric machine. An electronic driving control system, depending on a signal representing the driving speed of the motor vehicle, activates the first or second operating state. The driving control system activates the first operating state, at least in a first range of driving speeds that includes standstill of the vehicle, if the driving speed is less than a predetermined speed limit, and activates the second operating state, at least in a second range of driving speeds that includes the maximum speed of the vehicle, if the driving speed is greater than the predetermined speed limit.

At relatively low driving speeds in the forward direction of travel and in the reverse direction of travel, the motor vehicle is driven exclusively by the electric machine. The operating current is either fed from a battery of the motor vehicle or supplied from a second electric machine, operating as a generator and driven by the internal combustion engine, in the manner of a serial hybrid drive, as explained in more detail below. Insofar as the internal combustion engine is used for driving a generator, the coupling means in the first torque transmission path are disengaged.

The first electric machine, operated as a motor, operates only in a lower driving speed range, whereas the internal combustion engine drives the motor vehicle primarily in an upper driving speed range that includes the maximum speed. In this way, the first and the second torque transmission paths can be dimensioned independently from one other with respect to their speed transmission ratios, and matched in a targeted way to the different torque requirements in these two driving speed ranges. Whereas in the lower driving speed range, high wheel-driving torques can be reached, the internal combustion engine can drive the vehicle in continuous operation even at maximum speed. A variable-ratio transmission is not necessary in either of the two torque transmission paths, and particularly not in the first torque transmission path associated with the internal combustion engine.

The coupling means, via which the two torque transmission paths are disengaged or engaged either for the first electric machine or the internal combustion engine, can be of conventional design. For example, conventional friction clutches are suitable as well as positively-locking clutches such as claw clutches. Also suitable are couplings that are constructed in the manner of an epicyclic transmission so as to be switchable by a controllable brake between a free-running state and a torque-transmitting state. Since the two torque transmission paths are used at different driving speeds, the coupling means may also comprise free-running clutches such as one-way clutches.

In a preferred embodiment of the invention, the speed limit may be selected to be approximately equal to the driving speed which results from the maximum rotational speed of the first electric machine and the downstream reduction transmissions. The maximum rotational speed of the electric machine is determined by its mechanical strength, by its design, in particular the number of pole pairs, and by the maximum frequency with which the commutator switch, which is most often designed as semiconductor components such as variable-frequency invertor circuits or frequency converters is able to operate. Above this maximum rotational speed, if appropriate with the inclusion of a transition region, the wheel drive changes from the first operating state, acting exclusively by means of an electric motor, into the second operating state, in which at least part of the wheel-driving torque is applied by the internal combustion engine or, in the manner of a parallel hybrid, by the internal combustion engine and the second electric machine, then operating as a motor.

Preferably, the transmission arrangement is such that the ratio of input speed to output speed in the first torque transmission path is lower than in the second torque transmission path. In the first operating state, associated with the low driving speeds, as a result of the rotational speed ratio being higher, it is then possible for the driving torque to be raised to the relatively high torque values that are required for starting. Since the speed range in which the first electric machine is utilized for driving the vehicle is limited, the first electric machine can be dimensioned for a lower continuous output than the internal combustion engine, whose output must guarantee a continuous load capacity at maximum speed. In this connection, it has proven to be beneficial for the speed limit, up to which the first electric machine is utilized, to be located at approximately half the maximum speed. The usable speed range of the internal combustion engine when the first torque transmission path is coupled thus considerably overlaps the range of driving speeds envisaged for the first operating state. This overlap range can be used for changing over from the first to the second torque transmission path under load. Furthermore, at approximately half the maximum speed, the internal combustion engine is already delivering approximately half the maximum output. Hence, the second electric machine only needs to be designed for approximately half the maximum output of the internal combustion engine, in order to achieve the maximum output, together with the internal combustion engine, in the manner of a parallel hybrid, at any speed in the upper speed range.

As previously mentioned, a second electric machine can be connected mechanically in parallel with the internal combustion engine, and hence connected to the first torque transmission path. The second electric machine is expediently used both as a motor and as a generator. In the case of operation as a generator, the second electric machine may be used in the entire driving speed range of the motor vehicle for charging a battery of the motor vehicle that supplies a driving current. Below the speed limit, e.g. in the first operating state, the generator current can also drive the first electric machine directly. In motor operation, the second electric machine may be used to start the internal combustion engine. In particular, however, the second electric machine increases the wheel-driving torque supplied by the internal combustion engine, in the manner of a parallel hybrid drive, in the second operating state and at its lower limit in the region of the transition between the two operating states. Assuming a desired substantially constant driving output in the speed range between the speed limit and the maximum speed, the driving control system is able to reduce the wheel-driving output produced by the second electric machine, with increasing speed, which at the same time reduces the loading of the battery supplying the driving current for the second electric machine, with increasing driving speed. As the maximum speed is approached, the proportion of the internal to combustion engine in the overall wheel-driving torque becomes greater, and in the region of the maximum speed the vehicle is expediently driven exclusively by the internal combustion engine.

The clutches in the first and/or second torque transmission path are expediently controlled by the driving control system via actuators or the like. This provides the driving control system with the possibility of shifting the speed limit, determining the changeover operation between the two operating states, depending on the driving situation or, in the case of a changeover operation being performed under load, of ensuring a relatively soft, jolt-free transition from one operating state into the other. To this end, both clutches are engaged in the overlap region, the torque is slowly displaced from one torque transmission path to the other and then the load-free torque transmission path is disengaged once more. The changeover can also show hysteresis behavior, in such a way that the speed limits responsible for the changeover operation are different, depending on whether the motor vehicle is being accelerated or decelerated.

It is also possible, in the region of the transition, for both electric machines to operate simultaneously in a manner supplying a driving torque, for example during an acceleration phase or a braking phase.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings.

In the drawings wherein like references numerals denote similar elements throughout the several views.

DETAILED DESCRIPTION OF THE PRESENTLY PREFERRED EMBODIMENTS

Figure 1:
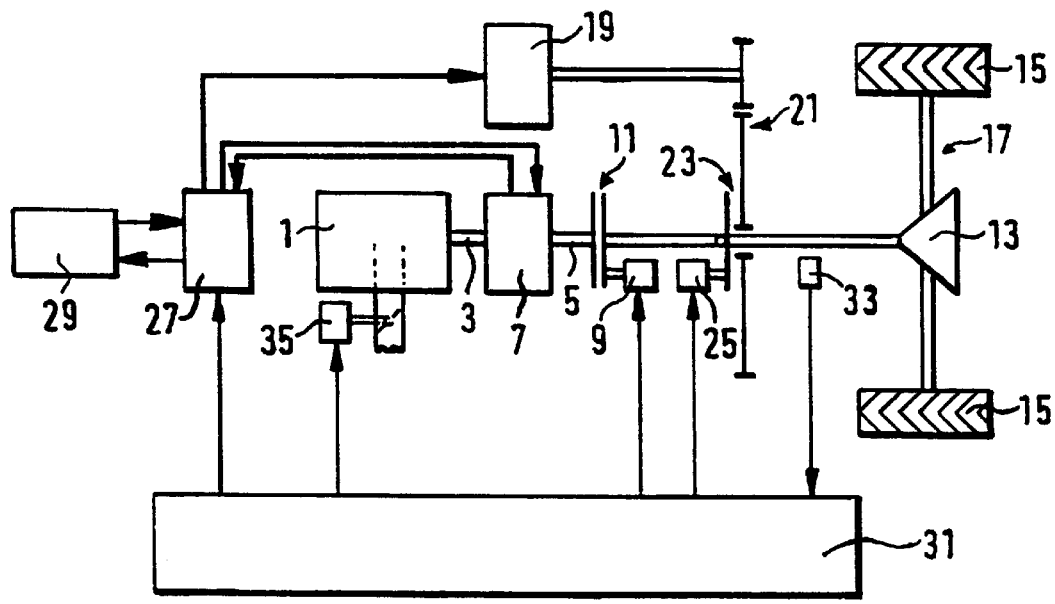
FIG. 1 is a block diagram of an exemplary embodiment of an inventive drive arrangement for a non-railbound motor vehicle in accordance with the present invention.

The hybrid drive shown schematically as a block diagram in FIG. 1 comprises an internal combustion engine 1, whose output shaft 3 is equiaxially and fixedly connected to the output shaft 5 of an electric machine 7 that can be operated both as a generator and as a motor. Via a clutch 11, for example a friction clutch, that can be actuated by means of an actuator 9, the unit formed from the internal combustion engine 1 and the electric machine 7 is connected to a differential transmission 13 of a drive axle unit 17, comprising driving wheels 15, of the motor vehicle. With the clutch 11 engaged, a first torque transmission path starts, via the output shafts 3, 5, the clutch 11 and the reducing differential transmission 13, from the internal combustion engine 1 and the electric machine 7 that is mechanically connected in parallel thereto, to the driving wheels 15.

The drive axle unit 17 can also be driven by another electric machine 19, operating as a motor, which is connected to the input of the differential transmission 13 via a reducing transmission 21 and another clutch 23 and corresponding actuator 25. Hence, a second torque transmission path starts from the electric machine 19, via the transmission 21, the clutch 23 and the differential transmission 13, to the driving wheels 15.

Neither of the two torque transmission paths contains a variable-ratio transmission, but each contains a controllable clutch, which allows either the electric machine 7 or the electric machine 19 to be brought into driving connection to the driving wheels 15. To the extent that transmissions are provided such as the differential transmission 13 or the reducing transmission 21 these are transmissions with a constant rotational speed transmission ratio for the associated torque transmission path. No transmission for reversing the direction of rotation is required. Instead, the direction of rotation of the electric machine 19 is reversed.

The electric machines 7, 19 are designed as multiple machines, a multiphase semiconductor switch unit 27 being provided for their commutation. The semiconductor switch unit 27, which can operate with controllable, variable commutation frequency in the manner of an invertor or a frequency converter, connects the electric machines 7, 19 for their motor operation to a battery 29 or other power source that supplies the driving current of the motor vehicle. However, in the case of generator operation, the switch unit 27 allows one or both electric machines 7, 19, here in particular the electric machine 7 that can be driven in generator operation by the internal combustion engine 1 when the clutch 11 is disengaged, irrespective of the driving situation of the motor vehicle, to feed the electric power generated in this way, suitably commutated, to the electric machine 19 that is driving the motor vehicle in motor operation. The switch unit 27 may further comprise rectifier stages to permit the battery 29 to be charged in the case of generator operation of the electric machines 7, 19, and in particular of the machine 7.

Although other designs are suitable, the rotor of the electric machine 7 is preferably mounted, without additional rotational bearing, directly on to the crankshaft of the internal combustion engine 1. The electric machine is preferably a permanent-magnet energized synchronous machine with an external rotor.

In order to control the operating states of the hybrid drive, an electronic driving control system 31 is provided, which responds in a manner not more closely illustrated to driving commands, which are produced, for example, by means of a gas pedal or a brake pedal or of a driving direction selector, and controls the actuators 9, 25 as a function of a signal that is generated by means of a sensor 33 and represents the instantaneous driving speed of the motor vehicle. In addition, the driving control system 31 controls the electric machines 7, 19 via the switch unit 27, as well as the operation of the internal combustion engine 1, in particular the output setting member of the latter, for example a throttle or an injection pump, which can be set by means of an actuator 35.

Figure 2:
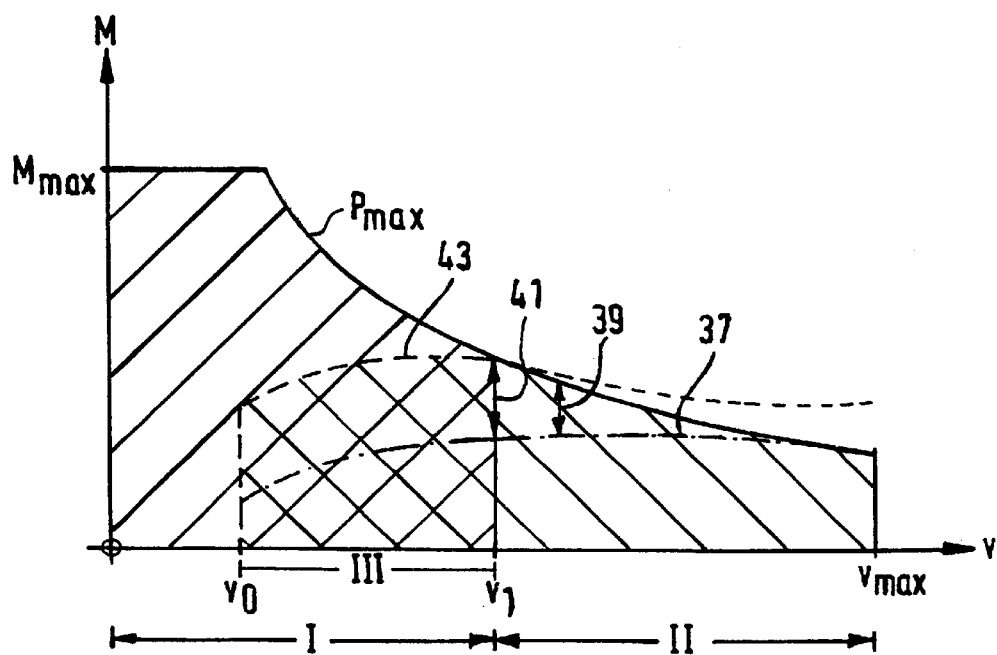
FIG. 2 is a graph of wheel driving torque M as a function of the driving speed v.

The activation of the electric machines 7, 19 and, if appropriate, of the internal combustion engine 1, is carried out, as shown in FIG. 2, as a function of the driving speed v. In a lower range I of driving speeds, which extends from standstill of tie vehicle to a speed threshold $v_1$, the motor vehicle is driven solely by the electric machine 19 operating as a motor. In speed range I the clutch 23 is engaged and the clutch 11 is disengaged. The ratios of the transmissions 13, 21 increase the output torque from the electric machine 19 to a value $M_{max}$ that is sufficiently high for starting. The electric machine 7, which is uncoupled from the differential transmission 13, operates as a generator and is driven by the internal combustion engine 1. The electrical energy that is produced feeds the electric machine 19 operating as a motor. In the speed range I, the inventive drive arrangement accordingly operates as a serial hybrid drive. Depending on the driving situation, part of the electrical energy produced by the electric machine 7 can also be utilized for charging the battery 29 or, if the output from the generator is not adequate, the electric machine 19 can also be additionally fed from the battery 29.

FIG. 2 shows, as indicated by hatching drawn from bottom left to top right, the range of the torque M in which the driving control system 31 can adjust the wheel-driving torque in the speed range I. Between a standstill and a corner speed $v_0$ that is determined by the rated data, in particular the rated rotational speed of the electric machine 19, the electric machine 19 generates an approximately constant torque; and, above the corner speed $v_0$, in a range in which the electric machine 19 operates with a weakening field, decreases hyperbolically, corresponding to a torque curve for constant output $P_{max}$. The speed limit $v_1$ which limits the speed range I in in the direction of rising speeds, is essentially determined by the maximum rotational speed of the electric machine 19, which results from mechanical limits and the maximum possible commutation frequency of the switch unit 27. The electric machine 19 also operates in the speed range I while reversing.

Above the speed limit $v_1$, the electric machine 19 is switched off, and the motor vehicle is then driven by the internal combustion engine 1 and the electric machine 7, then operating as a motor, in a speed range II that extends to the maximum driving speed $v_{max}$ of the motor vehicle. In this speed range II, indicated in FIG. 2 by hatching drawn from top left to bottom right, the clutch 23 is disengaged and the clutch 11 is engaged. The electric machine 7 is fed from the battery 29 in the manner of a parallel hybrid drive.

FIG. 2 shows, with a dash-dotted line 37, the full-load torque characteristic curve of the internal combustion engine 1. In the region of the limiting speed $v_1$, the full-load torque characteristic curve 37 remains below the torque line for maximum overall drive output $P_{max}$. The torque difference, indicated by an arrow 39, is compensated for by the drive torque supplied by the electric machine 7. As shown in FIG. 2, the differential amount required for the compensation decreases with increasing speed, with the result that, in the region of the maximum speed, the motor vehicle is driven exclusively by the internal combustion engine 1.

The maximum torque contribution 41 of the electric machine 7 likewise changes as a function of the driving speed v, and is indicated in FIG. 2 by a dashed line 43. As FIG. 2 shows, the torque contribution of the electric machine 7 to be added to the full-load torque characteristic curve 37 may lie above the torque line of maximum output $P_{max}$ in the speed range II. This excess torque can either be used for brief accelerations or may be limited by the driving control system 31 to a resulting overall drive output $P_{max}$.

The characteristic curves 37, 43 extend into the speed range I. In the speed range III that is indicated in FIG. 2 by cross-hatching, which in the extreme case extends from the driving speed $v_0$ established when the internal combustion engine is idling to the limiting speed $v_1$, the motor vehicle can be driven both by the electric machine 7, operating as a motor, and by the internal combustion engine together with the electric machine 19 that is connected in parallel. The choice of the suitable mode of operation is made by the control system 31, the current driving situation and the overall energy balance of the two modes of operation being taken into account. In the case of accelerations or decelerations, the speed range III is suitable for jolt-free load transfer from one mode of operation into another. The speed range III is restricted to speeds in the region of the limiting speed $v_1$, whereas in the remaining speed range I, the electric machine 7 is operated as a generator.

In another embodiment which is not illustrated the changeover between the modes of operation in the speed range I, on the one hand, and in the speed range II, on the other hand, is effected as a function of hysteresis. Changing over when accelerating, and hence with increasing driving speed, is in this case effected as a function of a speed limit which differs from the speed limit when braking, that is to say with decreasing driving speed, and is in particular greater than the last-mentioned speed limit. In this way, given driving speeds close to the speed limit, continuous changing between the two modes of operation is prevented.

In the exemplary embodiment explained above, the electric machine 19 is used exclusively as a motor. In still another embodiment which is not illustrated, in the speed range II, the electric machine 19 can be used for braking energy recovery as a generator for charging the battery 29. Moreover, the arrangement of the transmissions 21 and 13 and the configurations of the clutches 11 and 23 are not intended to be restricted to the embodiments shown in FIGS. 1 & 2 by way of illustrative example. In particular, a coaxial arrangement of the two torque transmission paths for a drive installed longitudinally in the vehicle is conceivable. As indicated in the exemplary embodiment illustrated, the clutches can also be designed as friction clutches. Since motor-operated electric machines are arranged in both torque transmission paths and can be used for synchronization, the clutches may alternatively be positively-locking clutches such as claw clutches. Since the torque transmission paths are effective in different driving speed ranges, it is also possible for at least one of the two clutches, in particular clutch II, to be a free-running or one-way clutch. Controllable epicyclic sets, as for example those used in automatic transmissions of motor vehicles are also contemplated, especially those that perform a transmission function at the same time.

By way of illustrative example, the following design data result in the case of a drive arrangement according to FIG. 1 in a motor vehicle which can be used up to a maximum speed of 220 km/h:
Internal combustion engine 1:
maximum output 130 kW
maximum torque 250 Nm
maximum engine speed 5500 $min^{-1}$
Electric machine 19:
maximum output 120 kW
maximum torque 420 Nm
Electric machine 7:
maximum output 90 kW
maximum torque 255 Nm
Transmission 13
Ratio of input speed to output speed i=3.3
Transmission 21:
Ratio of input speed to output speed i=2.2
Hence, in relation to the drive axle 17, the following data result:
Speed range I:
maximum torque 3050 Nm
maximum output 120 kW
maximum wheel speed 825 $min^{-1}$
speed limit $v_1$ 110 km/h
Speed range II:
maximum output 130 kW
maximum wheel speed: about 1650 $min^{-1}$
maximum driving speed 220 km/h Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Substitutions of elements from one described embodiments to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. A drive arrangement for a motor vehicle having a plurality of driving wheels, comprising:

an internal combustion engine connectable in a wheel-driving manner along a first torque transmission path to at least one driving wheel of the motor vehicle;

a first electric machine operable as a motor and connectable in a wheel-driving manner along a second torque transmission path to at least one driving wheel of the motor vehicle;

an energy source for supplying power to said first electric machine;

a coupling arranged in at least one of the first and second torque transmission paths and switchable between a first operating state and a second operating state, wherein in the first operating state the motor vehicle is driven by the wheel-driving torque of said first electric machine without mechanical torque support from said internal combustion engine, and in the second operating state the motor vehicle is driven by the wheel-driving torque from said internal combustion engine without mechanical torque support from said first electric machine;

an electronic driving control system for activating one of said operating states based on a signal representing a driving speed of the motor vehicle, said electronic driving control system activating the first operating state, at least in a first range of driving speeds, that includes a standstill of the motor vehicle, if the driving speed is less than a predetermined speed limit, and activating the second operating state, at least in a second range of driving speeds that includes a maximum speed of the motor vehicle, if the driving speed is greater than the predetermined speed limit; and a second electric machine operable as at least one of a motor and a generator, said second electric machine being connected in parallel to said first electric machine, said second electric machine operates as a motor at least in a portion of the second range of driving speed.

2. The drive arrangement in accordance with claim 1, wherein the predetermined speed limit is selected to be approximately equal to a maximum driving speed determined by said driving control system in the first operating state.

3. The drive arrangement in accordance with claim 1, further comprising a transmission arrangement disposed in said first and second torque transmission paths, said transmission arrangement having a ratio of input speed to output speed in the first torque transmission path lower than that in the second torque transmission path.

4. The drive arrangement in accordance with claim 1, wherein said first electric machine being dimensioned for a lower maximum continuous output than said internal combustion engine.

5. The drive arrangement in accordance with claim 1, wherein the predetermined speed limit is selected to be higher than a predetermined driving speed established, along the first torque transmission path, while said internal combustion engine is idling.

6. The drive arrangement in accordance with claim 1, wherein said second electric machine has a direct drive connection to said internal combustion engine.

7. The drive arrangement in accordance with claim 1, wherein said internal combustion engine and said second electric machine have equiaxially arranged output shafts.

8. The drive arrangement in accordance with claim 1, wherein said second electric machine has a rotor and said internal combustion engine has a crankshaft, and wherein the rotor of said second electric machine is mounted, on the crankshaft of said internal combustion engine.

9. The drive arrangement in accordance with claim 1, further comprising a clutch for disengaging a driving connection from said internal combustion engine and second electric machine to one of the driving wheels, said clutch being disposed in the first torque transmission path between said second electric machine and at least one of the driving wheels.

10. The drive arrangement in accordance with claim 9, wherein said clutch arranged in the first torque transmission path is disengaged at least in the first range of driving speeds.

11. The drive arrangement in accordance with claim 9, wherein said clutch is controllable by said electronic driving control system.

12. The drive arrangement in accordance with claim 11, wherein said clutch comprises a friction clutch actuatable by an actuator.

13. The drive arrangement in accordance with claim 9, wherein said clutch arranged in the first torque transmission path is engaged in a third range of driving speeds lower than the speed limit to transmit wheel-driving torques from at least one of said internal combustion engine and said second electric machine operating as a motor.

14. The drive arrangement in accordance with claim 1, wherein, at least in a portion of the first range of driving speeds, said second electric machine operates as a generator for at least one of feeding said first electric machine and charging an electrical energy supply of the motor vehicle.

15. The drive arrangement in accordance with claim 1, wherein, under full-load operation, said driving control system controls said second electric machine, in the second range of driving speeds, so that said second electric machine delivers a wheel-driving torque which increases a wheel-driving torque output by said internal combustion engine at full load to a value required in the second operating state to achieve an at least approximately constant driving output.

16. The drive arrangement in accordance with claim 1, wherein said first electric machine is dimensioned for a higher output in motor operation than that of said second electric machine.

17. The drive arrangement in accordance with claim 1, wherein at least one of the first and second torque transmission paths have a speed transmission ratio that is not operationally variable.

18. The drive arrangement in accordance with claim 1, wherein the predetermined speed limit has a first value when accelerating the motor vehicle and a second value, differing from the first value, when braking the motor vehicle.

19. The drive arrangement in accordance with claim 1, further comprising a clutch arranged in the second torque transmission path.

20. A drive arrangement for a motor vehicle having a plurality of driving wheels, comprising:

an internal combustion engine connectable in a wheel-driving manner along a first torque transmission path to at least one driving wheel of the motor vehicle;

a first electric machine operable as a motor and connectable in a wheel-driving manner along a second torque transmission path to at least one driving wheel of the motor vehicle;

an energy source for supplying power to said first electric machine;

a coupling arranged in at least one of the first and second torque transmission paths and switchable between a first operating state and a second operating state, wherein in the first operating state the motor vehicle is driven by the wheel-driving torque of said first electric machine without mechanical torque support from said internal combustion engine, and in the second operating state the motor vehicle is driven by the wheel-driving torque from said internal combustion engine without mechanical torque support from said first electric machine; and an electronic driving control system for activating one of said operating states based on a signal representing a driving speed of the motor vehicle, said electronic driving control system activating the first operating state, at least in a first range of driving speeds, that includes a standstill of the motor vehicle, if the driving speed is less than a predetermined speed limit, and activating the second operating state, at least in a second range of driving speeds that includes a maximum speed of the motor vehicle, if the driving speed is greater than the predetermined speed limit, at least one of the first and second torque transmission paths having a speed transmission ratio that is not operationally variable.

* * * * *